(12) United States Patent
Minakuchi

(10) Patent No.: US 8,144,136 B2
(45) Date of Patent: Mar. 27, 2012

(54) CONTROLLING DISPLAY BASED ON USER INSTRUCTION

(75) Inventor: Keiko Minakuchi, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 1245 days.

(21) Appl. No.: 11/439,344

(22) Filed: May 24, 2006

(65) Prior Publication Data

US 2006/0267970 A1    Nov. 30, 2006

(30) Foreign Application Priority Data

May 24, 2005    (JP) ................. 2005-151102

(51) Int. Cl.
*G06F 3/038*      (2006.01)
*G06K 15/00*      (2006.01)
(52) U.S. Cl. ..................... 345/204; 358/1.16
(58) Field of Classification Search ............... 358/1.16, 358/1.15, 1.18; 345/204
See application file for complete search history.

(56) References Cited

U.S. PATENT DOCUMENTS

| 6,707,571 | B1 * | 3/2004 | Kurashina | 358/1.18 |
| 6,782,402 | B1 * | 8/2004 | Hidaka et al. | 1/1 |
| 6,938,215 | B2 * | 8/2005 | Kobayashi et al. | 715/810 |
| 2005/0105129 | A1 * | 5/2005 | Takahashi | 358/1.15 |
| 2007/0296737 | A1 * | 12/2007 | Park et al. | 345/634 |
| 2008/0129757 | A1 * | 6/2008 | Tanaka et al. | 345/660 |

FOREIGN PATENT DOCUMENTS

| JP | 11-120202 | 4/1999 |
| JP | 2003-157195 | 5/2003 |
| JP | 2005-057617 | 3/2005 |

OTHER PUBLICATIONS

Japanese Office Action dated Feb. 2, 2010 in corresponding Japanese Application No. 2005-151102.

* cited by examiner

*Primary Examiner* — Benny Tieu
*Assistant Examiner* — Sunil Chacko
(74) *Attorney, Agent, or Firm* — Harness, Dickey & Pierce, PLC

(57) ABSTRACT

An apparatus, method, system, computer program and product, each capable of controlling display based on user instruction.

9 Claims, 13 Drawing Sheets

FIG. 7

| ID | USER NAME | FILE NAME | DATE | NO. OF PAGES |
|---|---|---|---|---|
| 1 | JIRO SATO | ANIMAL STUFF | 10/02 | 1 |
| 2 | ICHIRO SUZUKI | APPLICATION | 11/10 | 2 |
| 3 | ICHIRO SUZUKI | MEMO | 11/11 | 10 |
| 4 | JIRO SATO | CAT | 11/22 | 1 |
| 5 | JOHN SMITH | AGENDA | 12/13 | 5 |
| 6 | MARY SMITH | MINUTES | 12/17 | 3 |
| 7 | MARY SMITH | GUIDE | 12/20 | 1 |
| 8 | JOHN SMITH | DOG | 12/24 | 1 |
| ... | ... | ... | ... | ... |

CONTROLLING DISPLAY BASED ON USER INSTRUCTION

PRIORITY STATEMENT

This patent application is related to and claims priority under 35 U.S.C. §119 to Japanese patent application No. 2005-151102, filed on May 24, 2005, in the Japanese Patent Office, the entire contents of which are hereby incorporated by reference.

FIELD

Example embodiments of the present invention relate generally to an apparatus, method, system, computer program and product, each capable of controlling a display of an image forming apparatus based on a user instruction.

DESCRIPTION OF THE RELATED ART

An existing image forming apparatus may be provided with the function of storing one or more images in its memory. Upon receiving an instruction from a user, the image forming apparatus reads out one of the stored images for output. For example, the image forming apparatus may display a list of the file names of the stored images. The user searches through the list, and selects the file name representing the specific image that the user wants to output. Once the selection is made, the image forming apparatus reads out the specific image from the memory, and outputs the specific image as a printed document. While the above-described storing function has a number of advantages, selecting the specific image from the list can be cumbersome especially when the number of stored images is large.

SUMMARY

In light of the above-described and other problems, in an example embodiment, the present invention provides an apparatus, method, system, computer program and product, each capable of controlling a display of an image forming apparatus according to a user instruction. For example, the display control apparatus includes a reader, storage, display, input, and/or selector. The reader may read an original document into an electronic image. The storage may store the image in a corresponding manner with property information of the image and a thumbnail image generated from the image. The display may display a thumbnail screen, which shows the thumbnail image of the image, or a list screen, which shows an entry containing the property information of the image. The input may input a user instruction. The selector may select at least one of the thumbnail screen and the list screen according to the user instruction to cause the display to display the selected one of the thumbnail screen and the list screen.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein:

FIG. 7 is a property information table stored in the storage device shown in FIG. 5 according to an example embodiment of the present invention;

DETAILED DESCRIPTION OF EXAMPLE EMBODIMENTS

Figure 1:
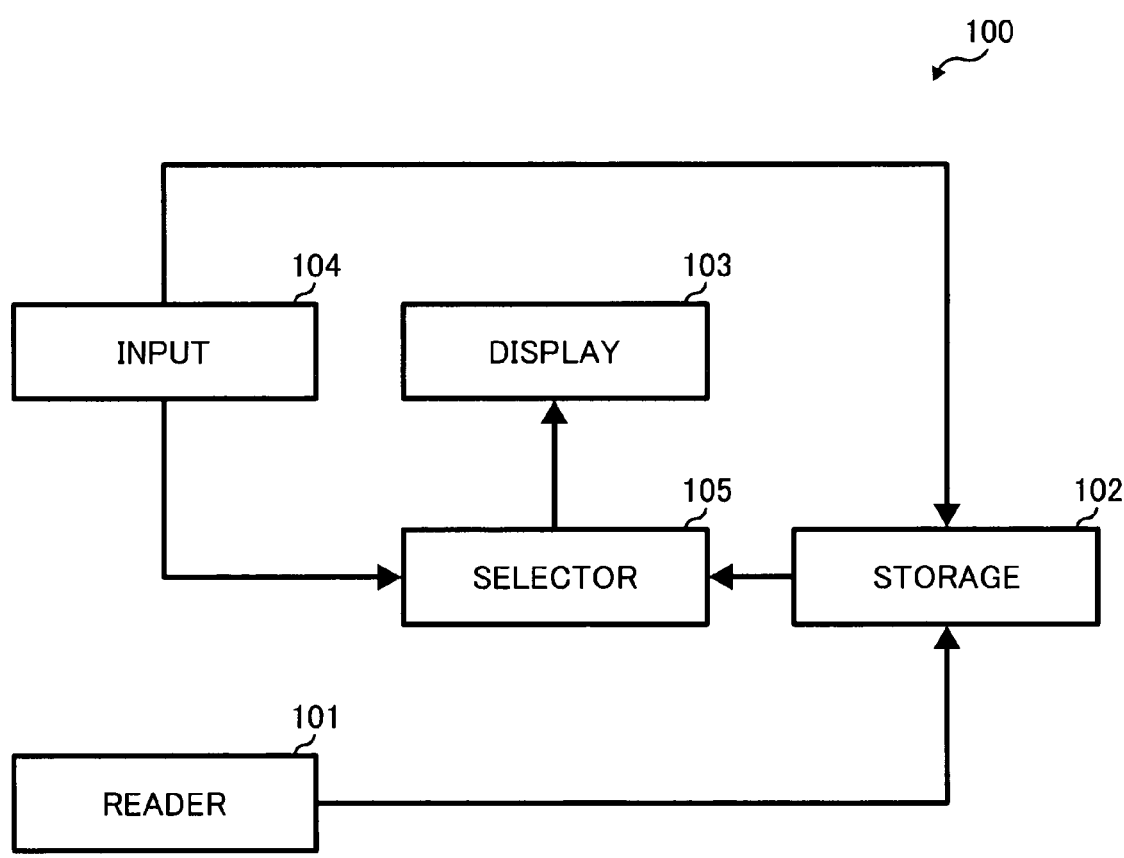
FIG. 1 is a schematic block diagram illustrating the functional structure of a display control apparatus according to an example embodiment of the present invention.

In describing example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates a display control apparatus 100 according to an example embodiment of the present invention.

Referring to FIG. 1, the display control apparatus 100 may include a reader 101, storage 102, display 103, input 104, and/or selector 105. The reader 101 reads an original document into an electronic image. The storage 102 stores the image read by the reader 101 in a corresponding manner with property information of the image and a thumbnail image of the image. The display 103 displays various kinds of screens to a user, for example, a thumbnail screen showing the thumbnail image of the image, or a list screen showing the property information of the image. The thumbnail screen may further show property information of the image in a corresponding manner with the thumbnail image of the image. The input 104 inputs an instruction received from a user, e.g., a user instruction.

The selector 105 controls the display 103 according to the user instruction. For example, the selector 105 may cause the display 103 to display the thumbnail screen when the user instruction selects the thumbnail screen. In another example, the selector 105 causes the display 103 to display the list screen when the user instruction selects the list screen.

In example operation, the display 103 displays either one of the thumbnail screen and the list screen. The display 103 may select one of the thumbnail screen and the list screen according to log information, if the log information is stored in the storage 102. The log information may indicate which one of the thumbnail screen and the list screen was previously displayed by the user.

Upon receiving the user instruction from the input 104, the selector 105 may cause the display 103 to switch its screen between the thumbnail screen and the list screen.

In an example, the thumbnail image shown in the thumbnail screen may include a first listed thumbnail image representing a first listed image of the thumbnail screen. The entry shown in the list screen may include a first listed entry representing a first listed image of the list screen. The selector 105 may make the first listed image of the thumbnail screen and the first listed image of the list screen the same, even when the display switches its screen between the thumbnail screen and the list screen.

Figure 2:
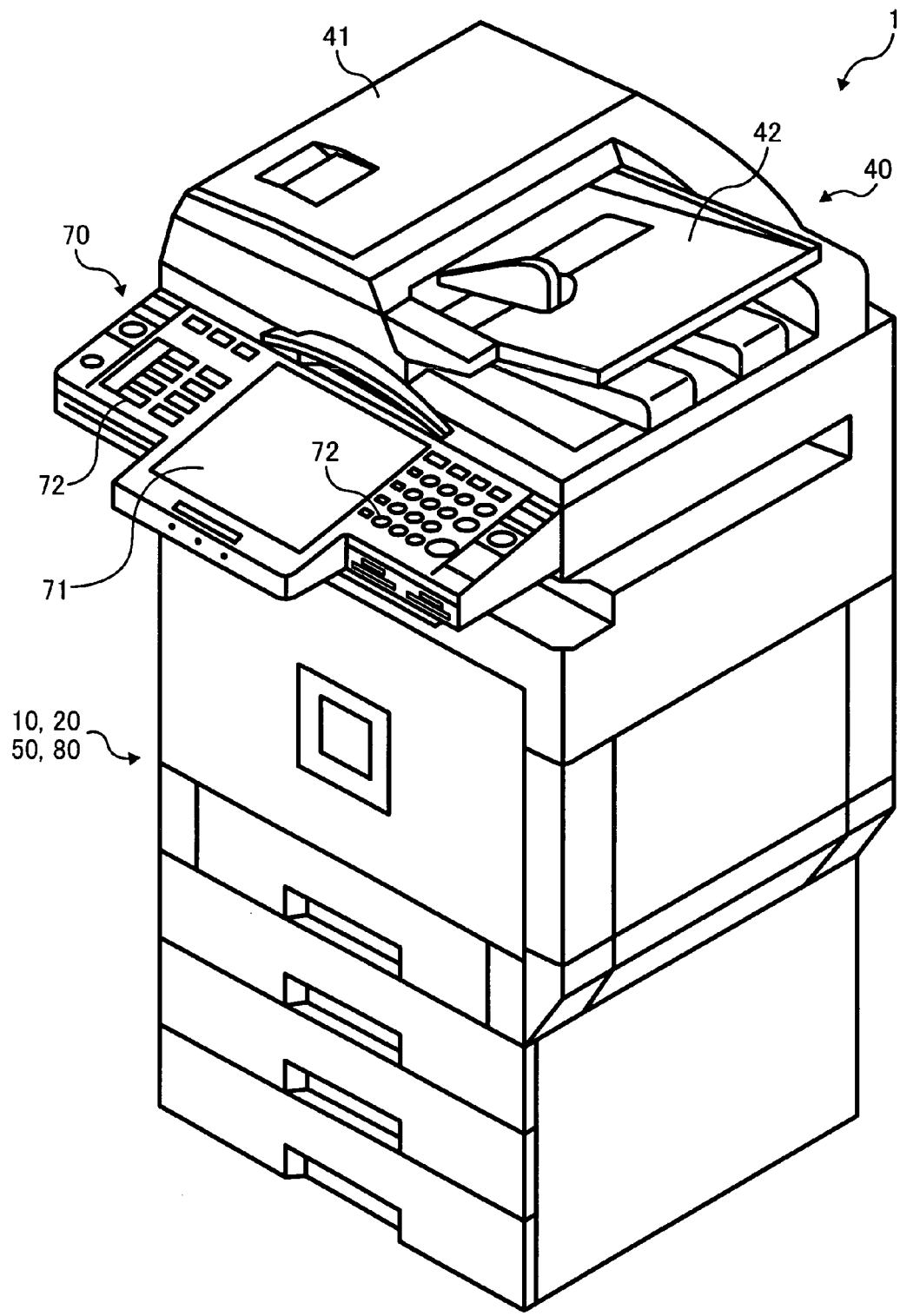
FIG. 2 is a perspective view illustrating the outer appearance of an image forming apparatus according to an example embodiment of the present invention.
Figure 3:
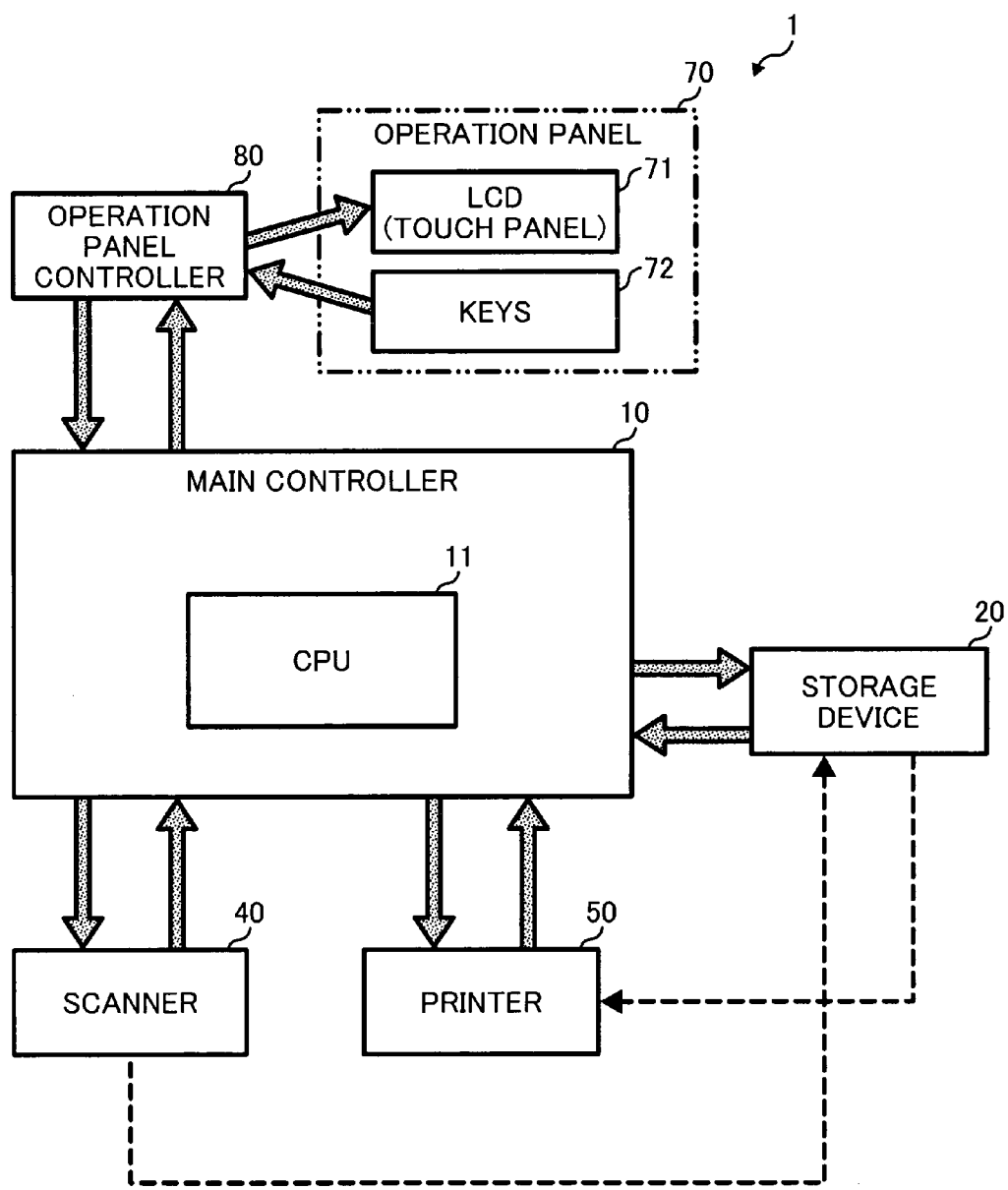
FIG. 3 is a schematic block diagram illustrating a portion of the hardware structure of the image forming apparatus shown in FIG. 2 according to an example embodiment of the present invention.

The display control apparatus 100 may be implemented in various ways, for example, as an image forming apparatus 1 shown in FIG. 2 or 3. Referring to FIGS. 2 and 3, the image forming apparatus 1 may include a main controller 10, a storage device 20, a scanner 40, a printer 50, an operation panel 70, and/or an operation panel controller 80. As shown in FIG. 2, the scanner 40 may include an automatic document feeder (ADF) 41 and a document tray 42, and may be mounted on the top surface of the image forming apparatus 1. The operation panel 70 may include a display, for example, a liquid crystal display (LCD) 71 and a group of keys (keys) 72, and may be provided at one side surface of the image forming apparatus 1. The image forming apparatus 1 may be provided with other elements or devices, for example, a finisher 64 and/or an output tray 65, as shown in FIG. 4.

Referring to FIG. 3, the main controller 10 may include a central processing unit (CPU) 11, which controls operation of the image forming apparatus 1. The scanner 40 scans an original document into an electronic image. The storage device 20 stores various data including the image obtained by the scanner 40. The printer 50 prints the image as a printed document. The operation panel controller 80 controls communication between the main controller 10 and the operation panel 70. The operation panel 70 allows a user to input various data via the keys 72, while displaying various data received from the main controller 10 on the LCD 71.

Figure 4:
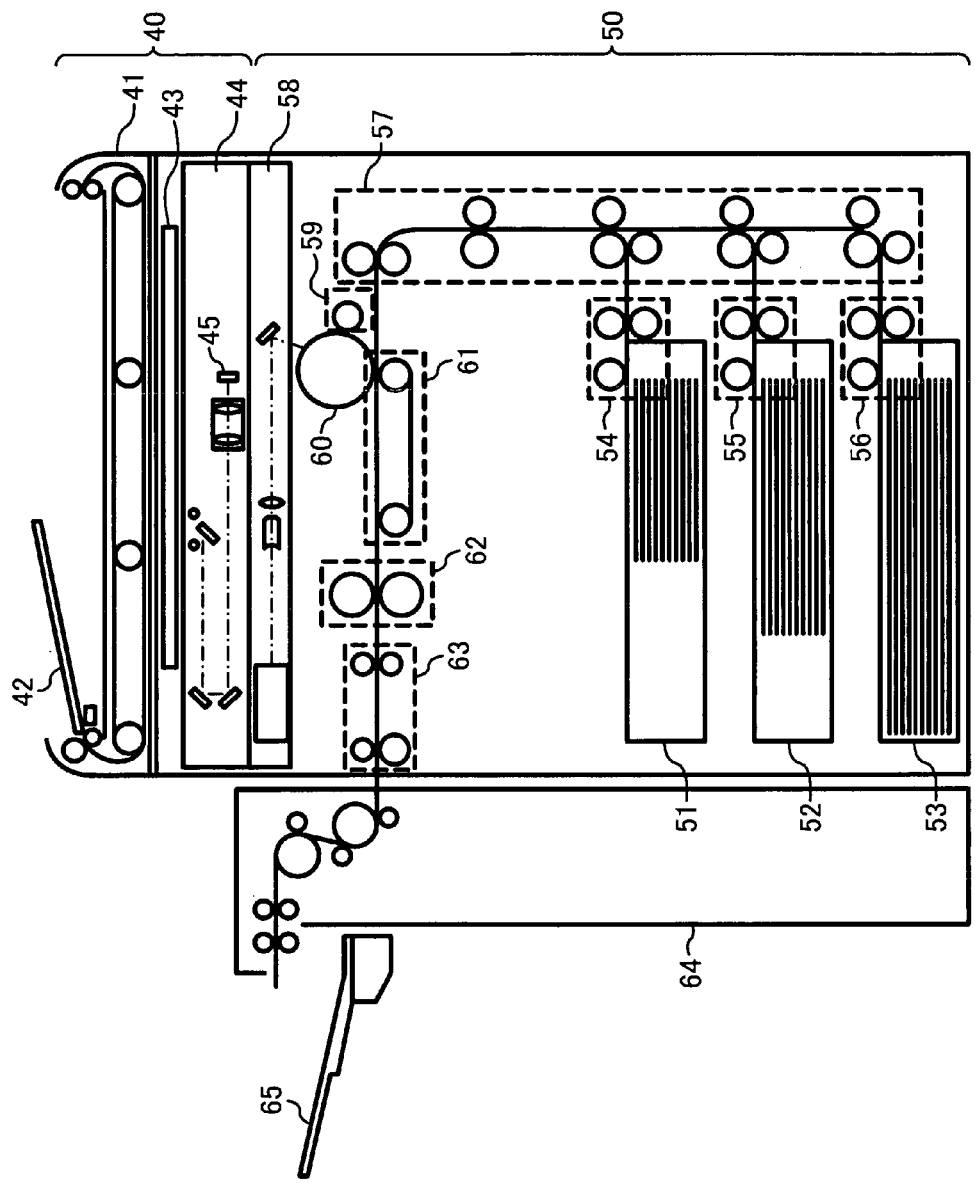
FIG. 4 is a cross sectional view illustrating the structure of a scanner and a printer of the image forming apparatus shown in FIG. 3 according to an example embodiment of the present invention.

Referring now to FIG. 4, the structure and the operation of the scanner 40 is explained according to an example embodiment of the present invention. The scanner 40 may include the ADF 41, the document tray 42, an exposure glass 43, and/or an image reading device 44 including an image sensor 45. In example operation, an original document may be placed on the document tray 42 or on the exposure glass 43. If the original document is placed on the document tray 42, the ADF 41 feeds the original document onto the exposure glass 43. The original document, placed on the exposure glass 43, is read into an electronic image by the image reading device 44 having the image sensor 45. The image sensor 45 may be implemented by a charged coupled device (CCD), for example. The image is sent to the storage device 20 of FIG. 3 under control of the main controller 10 of FIG. 3.

Figure 5:
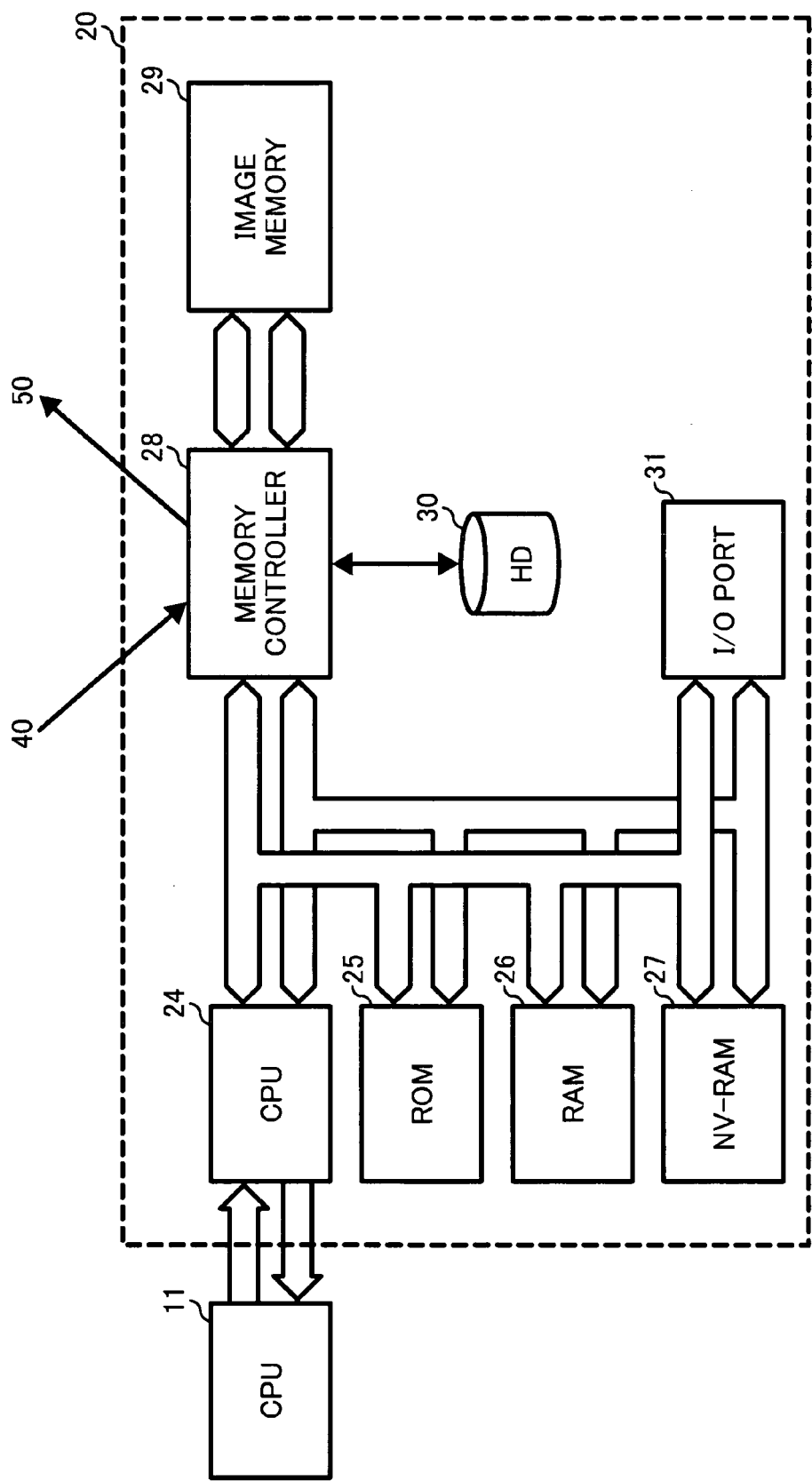
FIG. 5 is a schematic block diagram illustrating the structure of a storage device of the image forming apparatus shown in FIG. 3 according to an example embodiment of the present invention.

Referring now to FIG. 5, the structure and the operation of the storage device 20 is explained according to an example embodiment of the present invention. The storage device 20 may include a CPU 24, a read only memory (ROM) 25, a random access memory (RAM) 26, a non-volatile RAM (NVRAM) 27, a memory controller 28, an image memory 29, a hard disk drive (HD) 30, and/or an input/output port 31.

The CPU 24, which may be coupled to the CPU 11 of the main controller 10, controls operation of the memory controller 28, using data stored in any one of the ROM 25, the RAM 26, and the NV-RAM 27. For example, upon receiving an image from the scanner 40, the CPU 24 causes the memory controller 28 to store the image in the image memory 29 and/or the HD 30. Further, under control of the main controller 10, the CPU 24 causes the memory controller 28 to send the image to the printer 50 for further processing.

In an example, various image processing may be applied to the image before storing, for example, analog/digital conversion, shading correction, MTF (modulation transfer function) correction, gamma correction, size conversion, compression, etc. Similarly, various image processing may be applied to the image before sending to the printer 50. Further, in addition to the data stored in any one of the ROM 25, RAM 26, and NV-RAM 27, the CPU 24 may use external data obtained through the I/O port 31, for example.

Referring back to FIG. 4, the structure and the operation of the printer 50 is explained according to an example embodiment of the present invention. The printer 50 may include a first tray 51, a second tray 52, a third tray 53, a first feeder 54, a second feeder 55, a third feeder 56, a transfer device 57, a writing device 58, a developer 59, a photoconductor 60, an intermediate transfer device 61, a fixing device 62, a fourth feeder 63, the finisher 64, and/or the output tray 65.

In example operation, the writing device 58 forms a latent image on the surface of the photoconductor 60 according to the image, which is received from the storage device 20 under control of the main controller 10. The developer 59 develops the latent image into a toner image.

The toner image is then transferred to a recording medium, which is carried by the intermediate transfer device 61. In an example, the recording medium is transferred to the intermediate transfer device 61 from any one of the first tray 51, second tray 52, and third tray 52 by the corresponding one of the first feeder 54, second feeder 55, and third feeder 56, through the transfer device 57. The recording medium having the toner image thereon may be further transferred to the fixing device 62 by the intermediate transfer device 61. The fixing device 62 fixes the toner image onto the recording medium. The recording medium may be further carried by the fourth feeder 63 through the finisher 64 onto the output tray 65.

Figure 6:
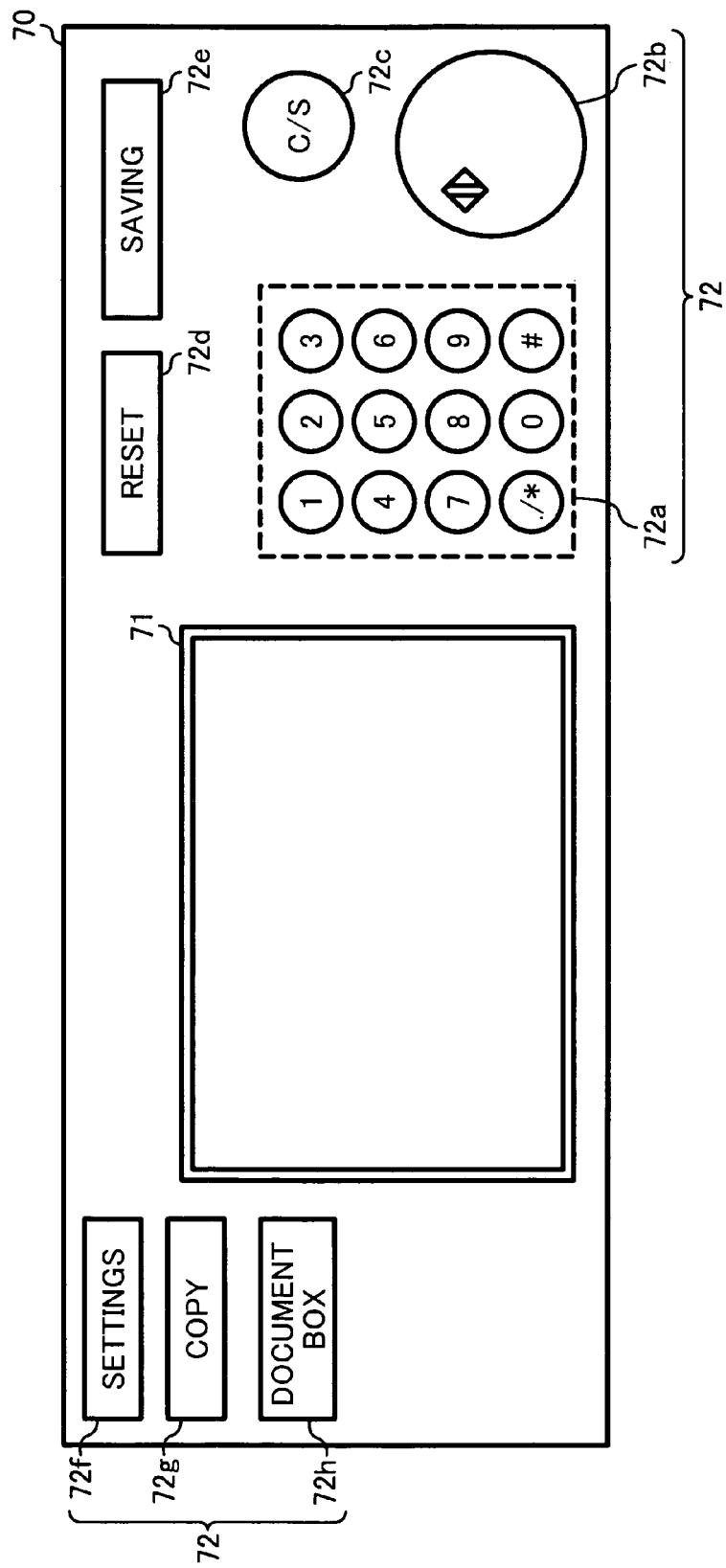
FIG. 6 is a front view illustrating the appearance of an operation panel of the image forming apparatus shown in FIG. 3 according to an example embodiment of the present invention.

Referring now to FIG. 6, the structure and the operation of the operation panel 70 is explained according to an example embodiment of the present invention. The LCD 71 displays various kinds of screen according to data received from the main controller 10 (FIG. 3) via the operation panel controller 80. In an example, the LCD 71 is integrated with a touch panel, which allows the user to make selections according to the contents of the screen displayed by the LCD 71. The selection is sent to the main controller 10 via the operation panel controller 80.

Still referring to FIG. 6, in an example, the keys 72 may include the ten digit keys 72a, the "START" key 72b, the CANCEL/STOP (C/S) key 72c, the "RESET" key 72d, the "SAVING" key 72e, the "SETTINGS" key 72f, the "COPY"

key 72g, and/or the "DOCUMENT BOX" key 72h. When one of the keys 72 is pressed, the operation panel controller 80 (FIG. 3) notifies the main controller 10 of the key that has been pressed. According to this notification, the main controller 10 controls the operation of the image forming apparatus 1. In an example operation, the ten digit keys 72a allow the user to input the number of original document sets to be copied. The "START" key 72b allows the user to perform a new operation or confirm information that has been input. The C/S key 72c allows the user to cancel or stop a current operation performed by the image forming apparatus 1. The "RESET" key 72d allows the user to clear the previous input and return to the default settings. The "SAVING" key 72e allows the user to change the operation mode of the image forming apparatus 1, for example, from a waiting mode to a saving mode. The "SETTINGS" key 72f allows the user to change the default settings of the image forming apparatus 1. The "COPY" key 72g allows the user to change the operation mode of the image forming apparatus 1, for example, from the waiting mode to a copy mode. The "DOCUMENT BOX" key 72h allows the user to change the operation mode of the image forming apparatus 1, for example, from the waiting mode to a storing mode.

As described above referring to FIG. 1, the image forming apparatus 1 is capable of controlling a screen of the LCD 71 according to a user instruction.

For example, the ROM 25 of the storage device 20 may store a display control program. When activated by the CPU 11, the display control program causes the CPU 11 to function as the selector 105 of FIG. 1. In another example, the display control program may be stored in a memory of the main controller 10, if such memory is provided in the main controller 10. In yet another example, the display control program may be externally obtained through the I/O port 31 from a removable medium or any kind of storage device coupled to the image forming apparatus 1.

In an example operation, the user causes the image forming apparatus 1 to store one or more images in the storage device 20. For example, the user presses the "DOCUMENT BOX" key 72h (FIG. 6) to change the operation mode of the image forming apparatus 1 from the waiting mode to the storing mode. Once the storing mode is selected, the image forming apparatus 1 changes the screen of the LCD 71 from a waiting-mode screen to a storing-mode screen. At this time, the user may place an original document onto the document tray 42 (FIG. 4), and presses the "START" key 72b (FIG. 6). The original document is then scanned into an electronic image, which is stored in the HD 30 (FIG. 5) of the storage device 20 as described above referring to FIGS. 4 and 5.

In an example, the image forming apparatus 1 is provided with a counter capable of counting a total number of pages or sheets of the original document being scanned. For example, when the recording medium is fed by either one of the first feeder 54, second feeder 55, and third feeder 56 (FIG. 4), the value of the counter is incremented by one.

The image forming apparatus 1 may be provided with a timer capable of detecting a current date or a current time. Using the timer, the image forming apparatus 1 can specify the date ("scanned date") or time ("scanned time") when the original document is scanned and stored as the electronic image.

When the original document is scanned into the electronic image, the LCD 71 may display a screen, which requests the user to input various information regarding the scanned image, for example, a name of the user ("user name") or a file name of the image. The user may input the user name or the file name, using a keyboard, which may be displayed by the LCD 71. Alternatively, the image forming apparatus 1 may display a user list of user names, if the user names are previously registered. The user may then select the specific user name from the user list. Alternatively, the image forming apparatus 1 may automatically assign an arbitrary number to the scanned image as the file name.

Any item of the above-described items and other information regarding the image, for example, the number of pages, number of sheets, scanned date, scanned time, user name, and/or file name may be stored in the NV-RAM 27 with the scanned image, as property information of the scanned image.

Further, in an example, a thumbnail image may be generated for the image stored in the HD 30. For example, a thumbnail image generating program may be stored in the ROM 25 of the storage device 20. When activated by the CPU 11, the thumbnail image generating program causes the CPU 11 to generate a thumbnail image of the scanned image. The thumbnail image may then be stored in the HD 30 of FIG. 5 with the scanned image and the property information.

Once the scanned image is stored in the storage device 20 in a corresponding manner with the property information and the thumbnail image, the image forming apparatus 1 may change the screen of the LCD 71 from the storing-mode screen to the waiting-mode screen to end the operation of storing one or more images.

Any one of the images stored in the storage device 20 of the image forming apparatus 1 may be output any time according to a user instruction. For illustrative purposes, it is assumed that the image forming apparatus 1 stores 22 images in the storage device 20. In an example, the NV-RAM 27 of FIG. 5 stores a property information table T shown in FIG. 7, which lists 22 entries each corresponding to one of the images stored in the HD 30. One entry of the property information table T includes an identification (ID) number that is uniquely assigned to the image when the image is generated from the original document, the user name, the file name, the scanned date, and the number of pages of the images. In an example, the entries of the property information table T are listed in an order in which the corresponding image is stored in the storage device 20. However, the order of the entries may be changed according to the user's preference.

In order to output one of the stored images, the user may press the "DOCUMENT BOX" key 72h (FIG. 6). The image forming apparatus 1 then changes the screen of the LCD 71 from the waiting-mode screen to the storing-mode screen. In an example, the storing-mode screen may look like a list screen shown in FIG. 8 or a thumbnail screen shown in FIG. 9.

Figure 8:
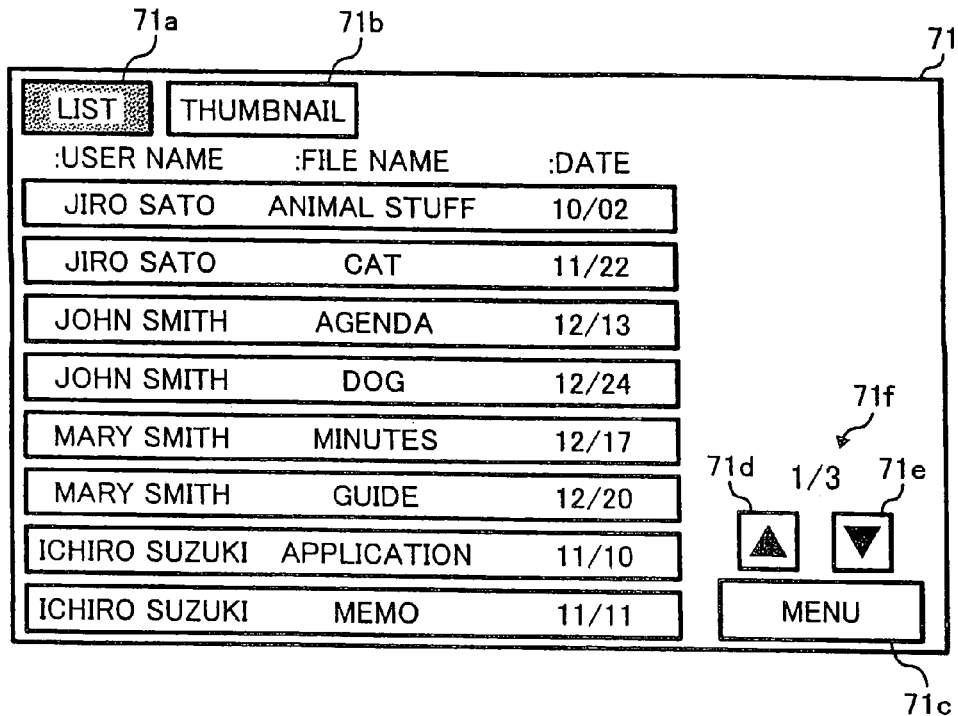
FIG. 8 is a list screen displayed by the operation panel shown in FIG. 6 according to an example embodiment of the present invention.

The list screen of FIG. 8 lists one or more selected items of the property information stored in the property information table T of FIG. 7. For example, the list screen of FIG. 8 may list the user name, file name, and storage date for each one of the stored images. In an example, the maximum number of entries that may be displayed by the LCD 71 at one time is set to eight. Accordingly, three pages of the list screen are required to display all 22 entries. As described above referring to FIG. 7, the order of entries may be changed according to the user's preference. The entries shown in FIG. 8 are sorted by the user name.

Figure 9:
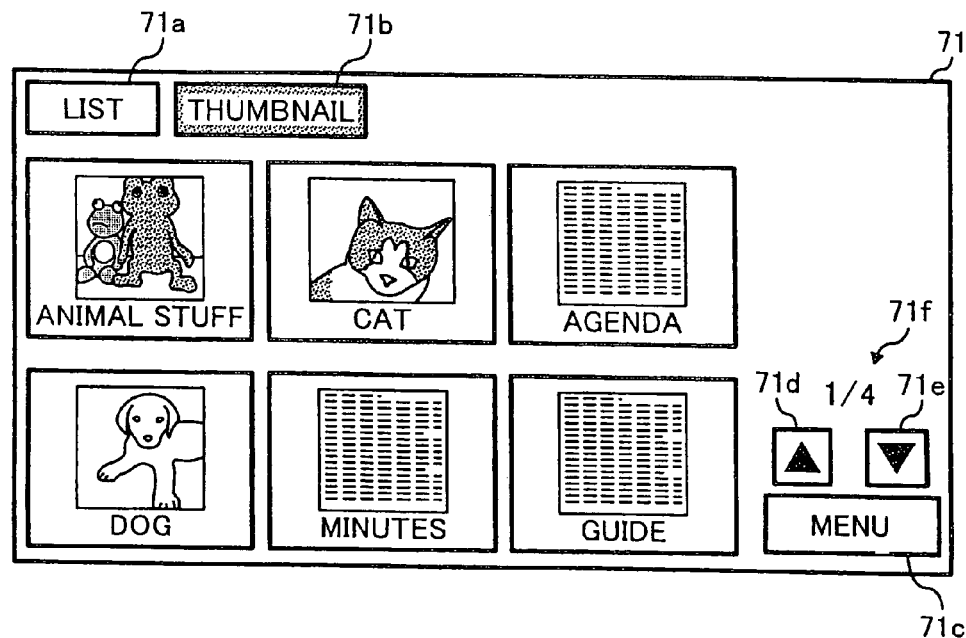
FIG. 9 is a thumbnail screen displayed by the operation panel shown in FIG. 6 according to an example embodiment of the present invention.

The thumbnail screen of FIG. 9 lists the thumbnail images generated from the stored images. In an example, the maximum number of thumbnail images that can be displayed by the LCD 71 at one time may be set to six. Accordingly, four pages of the thumbnail screens are required to display all 22 thumbnail images. The thumbnail screen may additionally display the property information of the image in a corresponding manner with the thumbnail image, for example, the file name as illustrated in FIG. 9.

The list screen of FIG. 8 and the thumbnail screen of FIG. 9 may each be provided with various keys, including the "LIST" key 71a, "THUMBNAIL" key 71b, menu key 71c, previous page key 71d, and next page key 71e. Additionally, the list screen of FIG. 8 and the thumbnail screen of FIG. 9 may each be provided with a page number indicator 71f. The page number indicator 71f indicates the page ("current page") currently displayed by the LCD 71, and either one of the total number of pages ("total number of pages for the list screen") required for the LCD 71 to display all entries of the stored images and the total number of pages ("total number of pages for the thumbnail screen") required for the LCD 71 to display all thumbnail images of the stored images.

In an example operation, when the "LIST" key 71a is selected by the user, the LCD 71 displays a list screen, for example, the list screen shown in FIG. 8. When the "THUBNAIL" key 71b is selected by the user, the LCD 71 displays a thumbnail screen, for example, the thumbnail screen shown in FIG. 9. When the menu key 71c is selected by the user, the LCD 71 displays the waiting-mode screen. When the previous page key 71d is selected by the user, the LCD 71 displays a previous page, which lists a preceding set of entries or thumbnail images that precede the current set of entries or thumbnail images displayed on the current page. When the next page key 71e is selected by the user, the LCD 71 displays a next page, which lists a following set of entries or thumbnail images that follow the current set of entries or thumbnail images displayed on the current page.

From the list of entries of the list screen or the list of thumbnail images of the thumbnail screen, the user selects the image that the user wants to output. Once the selection is made by the user, the image forming apparatus 1 causes the printer 50 to print the specified image as a printed document.

Referring now to FIGS. 10A to 10F, an operation of controlling the screen of the LCD 71, performed by the CPU 11, is explained according to an example embodiment of the present invention. For simplicity, in any one of FIGS. 10A to 10F, the images stored in the HD 30 are referred, respectively, by the reference numbers D1 to D22. Further, the property information table T is provided to indicate the correspondence between a current set of entries in the property information table T and a current page of the screen containing the current set of entries or thumbnail images.

Figure 10A:
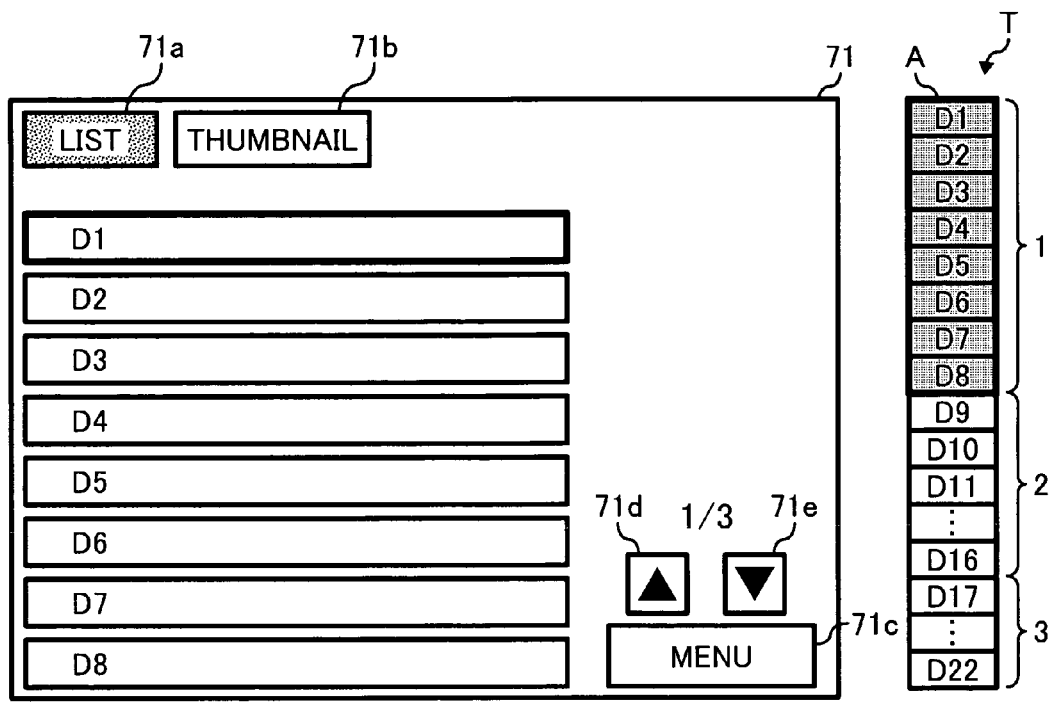
FIGS. 10A to 10F are illustrations for explaining an operation of controlling a display of the image forming apparatus shown in FIG. 3 according to an example embodiment of the present invention.

Referring to FIG. 10A, the LCD 71 displays the first page of a list screen, when the "LIST" key 71a is selected. Since the maximum number of entries that can be displayed in one page is eight, three pages are required to display the entries of 22 images D1 to D22. When the first page is selected for display as indicated by the page number indicator 71f, the first to eighth entries listed in the property information table T (indicated by section A) are selected as a current set of entries to be displayed on the first page of the list screen. Accordingly, the LCD 71 displays the property information of the first to eighth images D1 to D8.

Figure 10B:
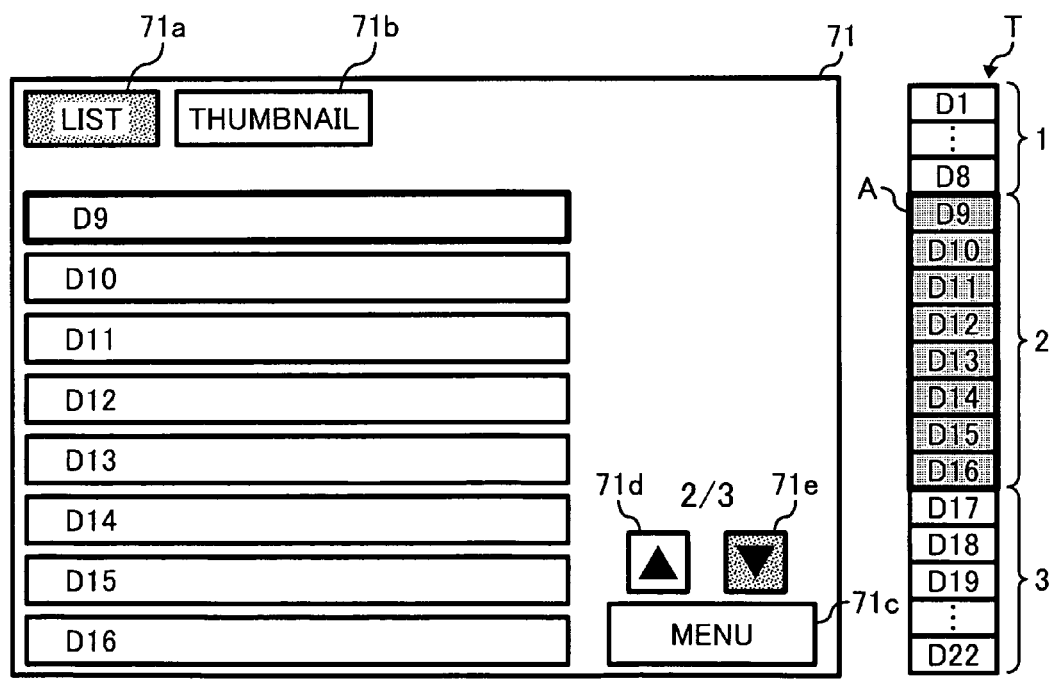

Referring to FIG. 10B, the LCD 71 displays the second page of the list screen, when the next page key 71e is selected. Because the second page is selected for display, the page number indicator 71f is updated to indicate that the current page is "2". At the same time, the ninth to sixteenth entries listed in the property information table T (indicated by section A) are selected as a current set of entries to be displayed by the second page of the list screen. Accordingly, the LCD 71 displays the property information of the ninth to sixteenth images D9 to D16.

In order to switch from the list screen to a thumbnail screen, the user selects the "THUMBNAIL" key 71b shown in FIG. 10B.

In an example, when the "THUMBNAIL" key 71b is selected by the user, the CPU 11 may cause the LCD 71 to display a page of the thumbnail screen, which corresponds to the current page of the list screen. However, if the maximum number of entries that can be displayed in one page differs from the maximum number of thumbnail images that can be displayed in one page, the image ("first listed image of the thumbnail screen") represented by the thumbnail image listed first in the current page of the thumbnail screen may be different from the image ("first listed image of the list screen") represented by the entry listed first in the current page of the list screen. For example, if the LCD 71 displays the second page of the thumbnail screen, which corresponds to the second page of the list screen shown in FIG. 10B, the first listed image of the thumbnail screen will be the seventh image D7, which is different from the firstly listed image of the list screen, e.g., the ninth image D9 shown in FIG. 10B. This may reduce the user's productivity in finding the specific image.

Figure 10C:
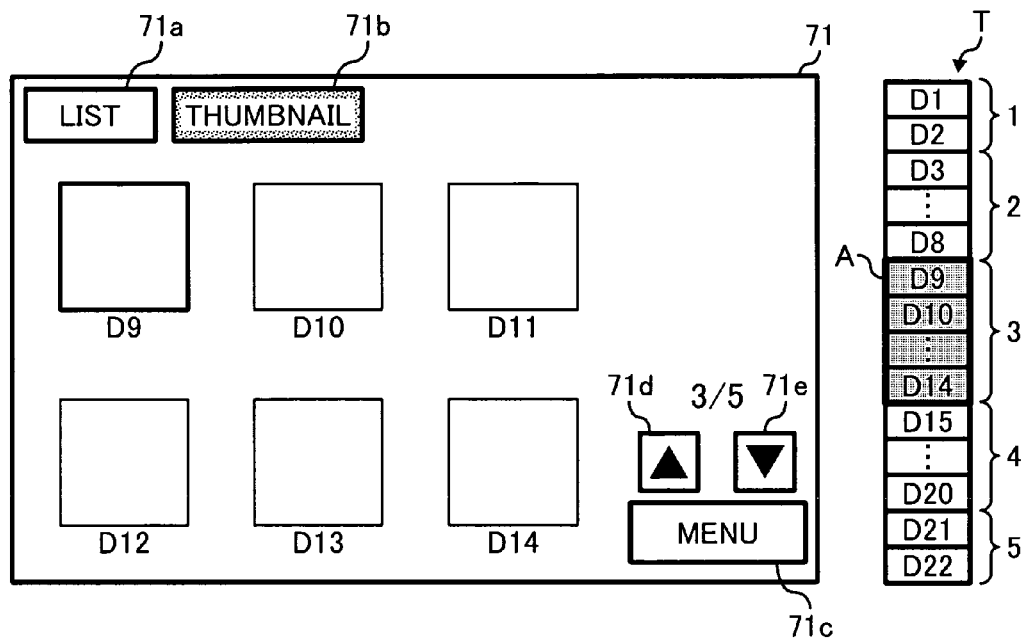

In view of the above, in another example, the first listed image of the thumbnail screen and the first listed image of the list screen are maintained the same. For example, the second page of the list screen shown in FIG. 10B is changed to a third page of the thumbnail screen shown in FIG. 10C. Referring to FIG. 10C, the thumbnail image of the ninth image D9 is listed first in the third page of the thumbnail screen. Because the first listed image of the thumbnail screen and the first listed image of the list screen are both the ninth image D9, the user may be able to find the specific image more easily.

In order to keep the first listed image the same between the list screen and the thumbnail screen, the CPU 11 of FIG. 5 adjusts the total number of pages between the list screen and the thumbnail screen. In an example, the total number of pages for the thumbnail screen, which was initially set to "4" as shown in FIG. 9, is adjusted to be "5" as shown in FIG. 10C.

Figure 10D:
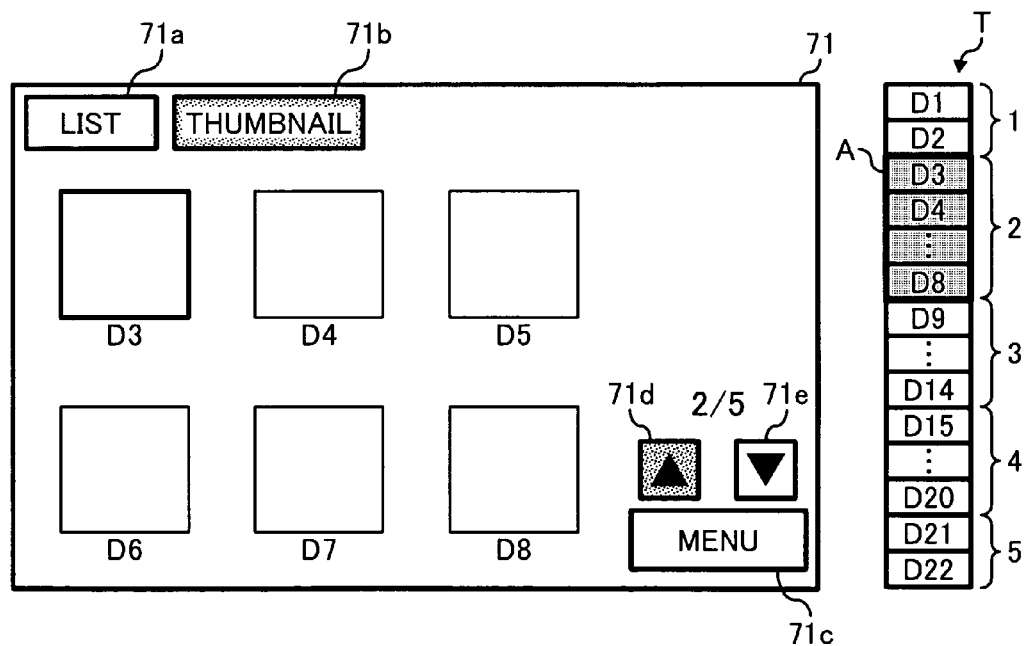

Referring to FIG. 10D, the LCD 71 displays the second page of the thumbnail screen, when the previous page key 71d is selected. Because the second page is selected for display, the page number indicator 71f is updated to indicate that the current page is "2". At the same time, the third to eighth thumbnail images, which correspond to the third to eighth entries listed in the property information table T (indicated by section A), are selected as a current set of thumbnail images to be displayed by the second page of the thumbnail screen.

Figure 10E:
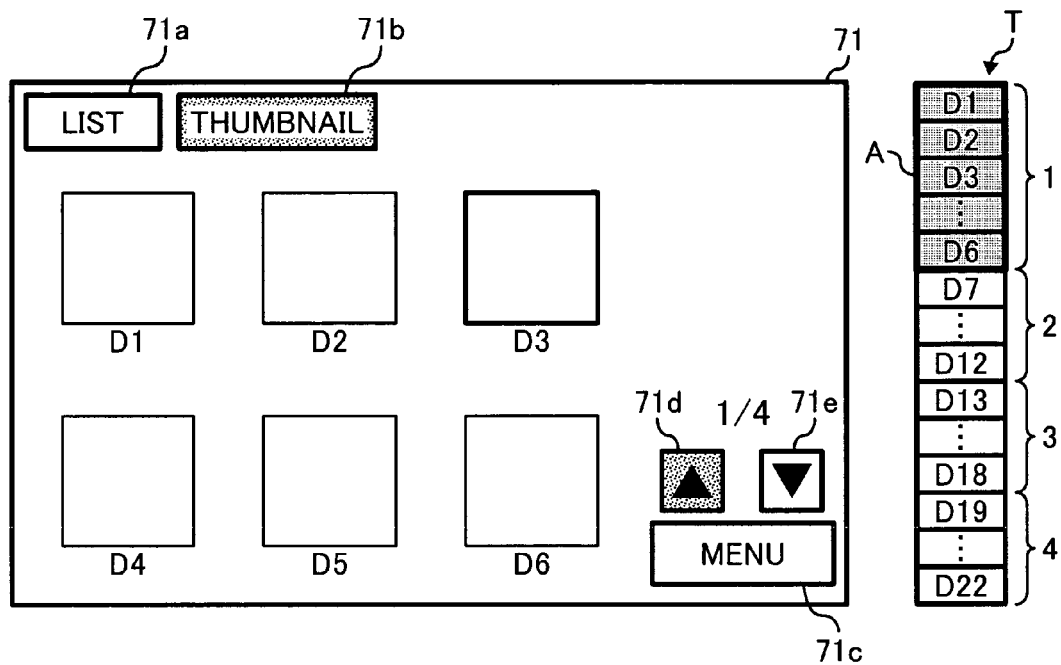

Referring to FIG. 10E, the LCD 71 displays the first page of the thumbnail screen, when the previous page key 71d is selected. Because the first page is selected for display, the page number indicator 71f is updated to indicate that the current page is "1". In an example, instead of displaying only the first and second thumbnail images, the first to sixth thumbnail images are displayed, which correspond to the first to sixth entries listed in the property information table T (indicated by section A). For example, the total number of pages for the thumbnail screen is adjusted to be the initial value of "4", as indicated by the page number indicator 71f.

Figure 10F:
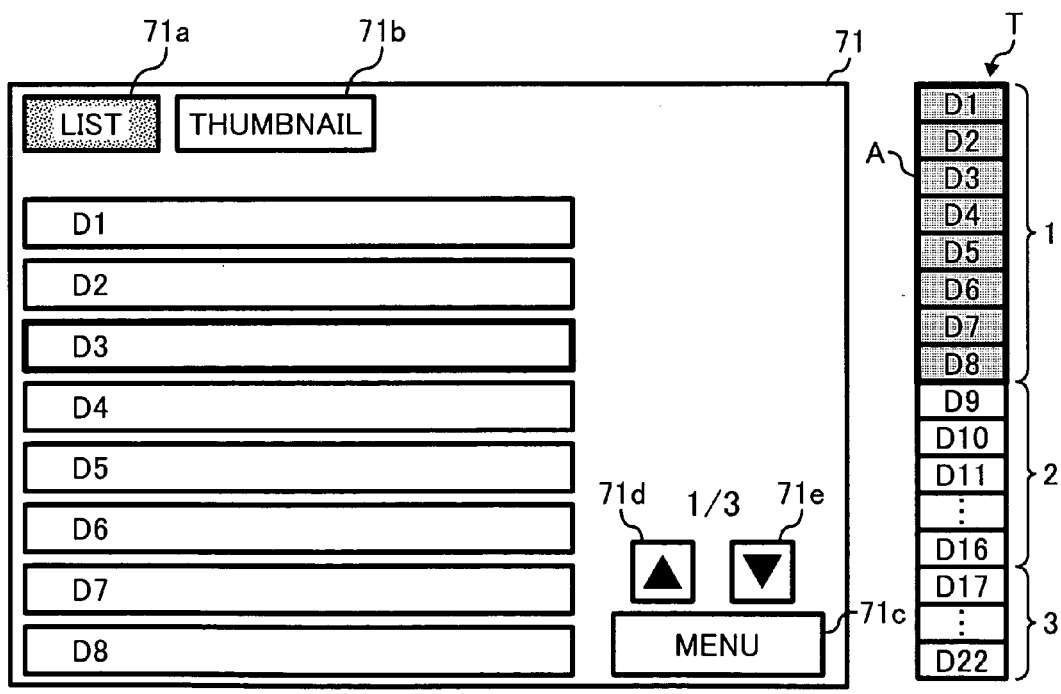

Referring to FIG. 10F, the LCD 71 displays the first page of the list screen, when the "LIST" key 71a is selected. The first entry, which corresponds to the first image D1, continues to be displayed first even after the thumbnail screen of FIG. 10E is switched to the list screen of FIG. 10F.

Figure 11:
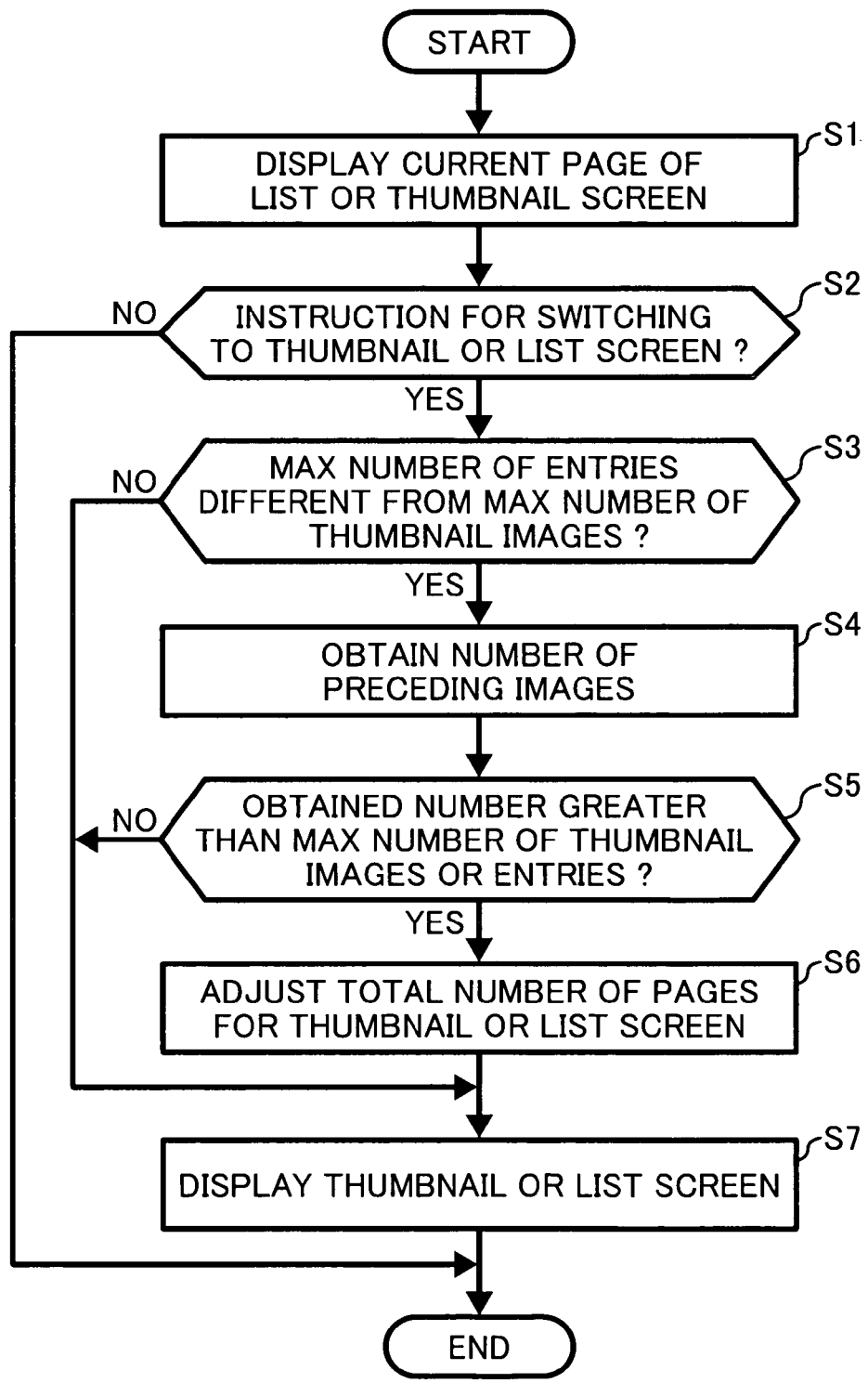
FIG. 11 is a flowchart illustrating an operation of adjusting the total number of pages for a screen displayed by the operation panel shown in FIG. 6 according to an example embodiment of the present invention.

Referring now to FIG. 11, an operation of adjusting the total number of pages for the list screen or the thumbnail screen is explained according to an example embodiment of the present invention. The operation of FIG. 11 may be performed by the CPU 11, for example, when the list screen shown in FIG. 10B is switched to the thumbnail screen shown in FIG. 10C.

At S1, the LCD 71 displays a current page of the list screen or the thumbnail screen. In an example, the LCD 71 displays the current page of the list screen, for example, the list screen shown in FIG. 8. In another example, the LCD 71 displays the current page of the thumbnail screen, for example, the thumbnail screen shown in FIG. 9. In an example, whether to display the list screen or the thumbnail screen may be previously set using the "SETTINGS" key 72f (FIG. 6). Alternatively, whether to display the list screen or the thumbnail screen may be determined based on log information, which indicates the type of screen previously displayed by the user.

S2 determines whether an instruction for switching the screen is input by the user. If the user instruction is input ("YES" at S2), the operation proceeds to S3. Otherwise ("NO" at S2), the operation ends. In an example, when the LCD 71 displays the list screen at S1, the CPU 11 determines that the user instruction is input when the "THUMBNAIL" key 71b is selected. In another example, when the LCD 71 displays the thumbnail screen at S1, the CPU 11 determines that the user instruction is input when the "LIST" key 71a is selected.

S3 determines whether the maximum number of entries that can be displayed in one page of the list screen differs from the maximum number of thumbnail images that can be displayed in one page of the thumbnail screen. If different ("YES" at S3), the operation proceeds to at S4. Otherwise ("NO" S3), the operation proceeds to S6.

S4 obtains the number of preceding images that precede the first listed image of the currently displayed list screen or the thumbnail screen. For example, if the first listed image is the ninth image D9 as shown in FIG. 10B, the number of preceding images is eight.

S5 determines whether the number of preceding images is greater than the maximum number of thumbnail images or the maximum number of entries. If the number of preceding images is greater than the maximum number ("YES" at S5), the operation proceeds to S6. Otherwise ("NO" at S5), the operation proceeds to S7. In an example, whether to use the maximum number of thumbnail images or the maximum number of entries is determined according to the user instruction input at S2. In an example, when the "THUMBNAIL" key 71b is selected at S2 to switch from the list screen to the thumbnail screen, the determination is made based on the maximum number of thumbnail images. In another example, when the "LIST" key 71a is selected at S2 to switch from the thumbnail screen to the list screen, the determination is made based on the maximum number of entries.

S6 adjusts the total number of pages for the list screen or the thumbnail screen. In an example, whether to use the list screen or the thumbnail screen is determined according to the user instruction input at S2. In an example, when the "THUMBNAIL" key 71b is selected at S2 to switch from the list screen to the thumbnail screen, the total number of pages for the thumbnail screen is adjusted. In another example, when the "LIST" key 71a is selected at S2 to switch from the thumbnail screen to the list screen, the total number of pages for the list screen is adjusted.

S7 displays the thumbnail screen or the list screen, and the operation ends. In an example, when the "THUMBNAIL" key 71b is selected at S2 to switch from the list screen to the thumbnail screen, the CPU 11 causes the LCD 71 to display the thumbnail screen having the adjusted or unadjusted total number of pages. In another example, when the "LIST" key 71a is selected at S2 to switch from the thumbnail screen to the list screen, the CPU 11 causes the LCD 71 to display the list screen having the adjusted or unadjusted total number of pages.

Figure 12:
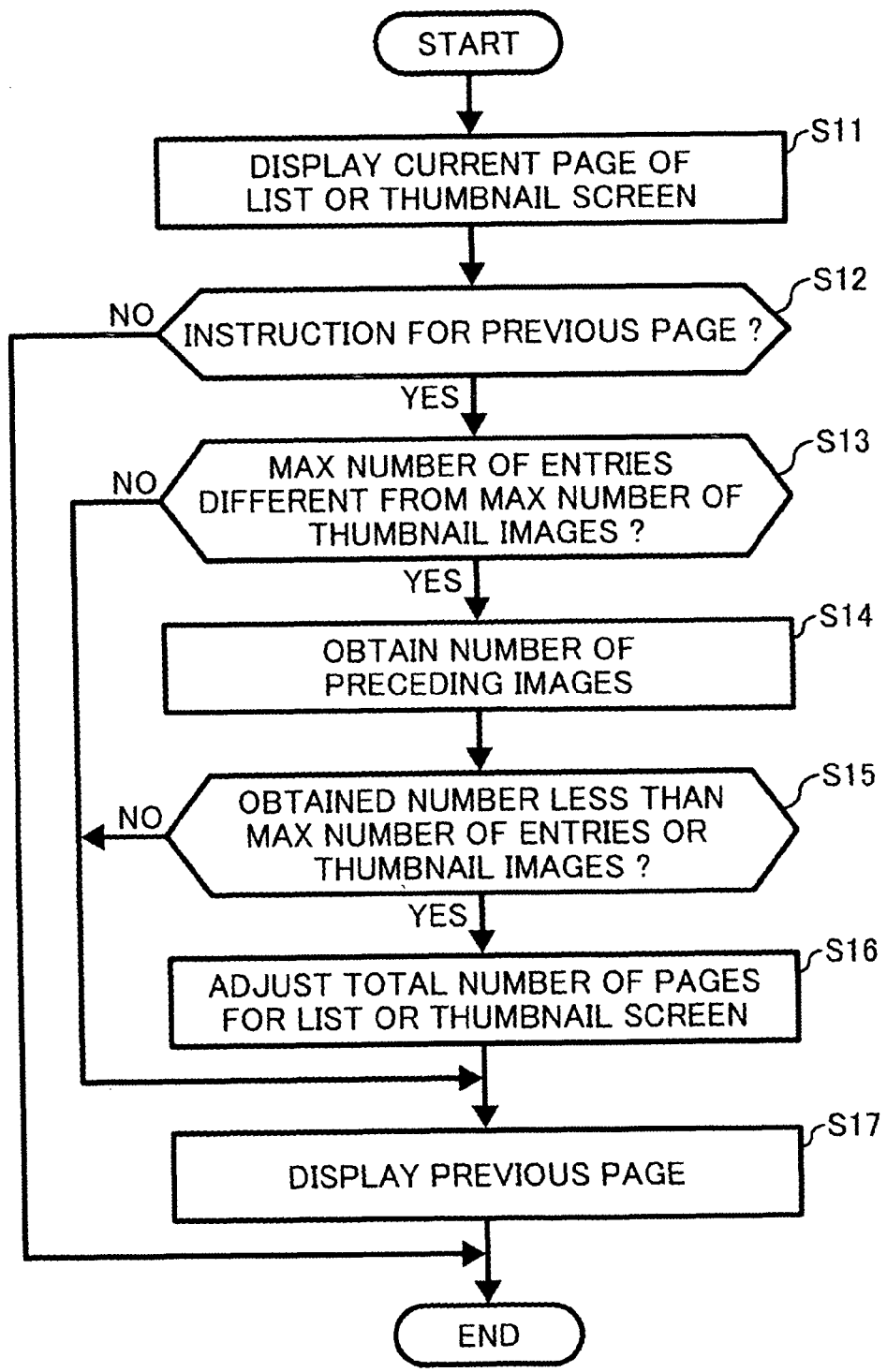
FIG. 12 is a flowchart illustrating an operation of adjusting the total number of pages for a screen displayed by the operation panel shown in FIG. 6 according to an example embodiment of the present invention.

Referring now to FIG. 12, an operation of adjusting the total number of pages for the list screen or the thumbnail screen is explained according to an example embodiment of the present invention. The operation of FIG. 12 may be performed by the CPU 11, for example, when the screen shown in FIG. 10D is switched to the screen shown in FIG. 10E.

S11 causes the LCD 71 to display a current page of the list screen or the thumbnail screen. In an example, the LCD 71 displays the current page of the list screen, for example, the list screen shown in FIG. 8. In another example, the LCD 71 displays the current page of the thumbnail screen, for example, the thumbnail screen shown in FIG. 9. In an example, whether to display the list screen or the thumbnail screen may be previously set using the "SETTINGS" key 72f (FIG. 6). Alternatively, whether to display the list screen or the thumbnail screen may be determined based on log information, which indicates the type of screen previously displayed by the user.

S12 determines whether an instruction for switching to the previous page is input by the user. If the user instruction is input ("YES" at S12), the operation proceeds to S13. Otherwise ("NO" at S12), the operation ends. For example, the CPU 11 determines that the user instruction is input when the previous page key 71d is selected.

S13 determines whether the maximum number of entries that can be displayed in one page of the list screen differs from the maximum number of thumbnail images that can be displayed in one page of the thumbnail screen. If they are different from each other ("YES" at S13), the operation proceeds to S14. Otherwise ("NO" at S13), the operation proceeds to S16.

S14 obtains the number of preceding images that precede the first listed image of the list screen or the thumbnail screen. For example, if the firstly listed image is the third image D3 as shown in FIG. 10D, the number of preceding images is two.

S15 determines whether the number of preceding images is less than the maximum number of entries or the maximum number of thumbnail images. If the number of preceding images is less than the maximum number ("YES" at S15), the operation proceeds to S16. Otherwise ("NO" at S15), the operation proceeds to S17. In an example, whether to use the maximum number of entries or the maximum number of thumbnail images is determined based on the type of screen currently displayed. In an example, when the list screen is displayed at S11, the determination is made based on the maximum number of entries. In another example, when the thumbnail screen is displayed at S11, the determination is made based on the maximum number of thumbnail images.

S16 adjusts the total number of pages for the list screen or the thumbnail screen. In an example, when the list screen is displayed at S11, the total number of pages for the list screen is adjusted to be the initially set value. In another example, when the thumbnail screen is displayed at S11, the total number of pages for the thumbnail screen is adjusted to be the initially set value, for example, as described above referring to FIG. 10E.

S17 displays the previous page of the list screen or the thumbnail screen, and the operation ends. In an example, when the list screen is displayed at S11, the previous page of the list screen is displayed. In another example, when the thumbnail screen is displayed at S11, the previous page of the thumbnail screen is displayed.

Numerous additional modifications and variations are possible in light of the above teachings. It is therefore to be understood that within the scope of the appended claims, the disclosure of this patent specification may be practiced in ways other than those specifically described herein.

For example, the user interface described above and associated display control apparatus may be implemented in a device other than an image forming apparatus, for example, a printer, photocopier, or multi-function product. Such examples include, but are not limited to, mobile phones, digital cameras, computers, and PDAs.

The user interface described above and associated display control apparatus may be activated by a user pressing button(s) on an input screen, collocated with the device or may be activated and/or operated by remote control.

The user interface described above and associated display control apparatus may also be implemented with log-in information where individual user settings and/or preferences may be separately retained.

The user interface described above and associated display control apparatus may also be implemented with authorization code information, so that only authorized users may access the device or only authorized user's with authorization code information may access the device.

The user interface described above and associated display control apparatus may also be networked with any number of similar devices or other devices.

The user interface described above and associated display control apparatus may also be implemented with other attributes than those described above (list information, thumbnail images, and images). These other attributes may include icons. Although the user interface described above and associated display control apparatus are described in the context of still image information, either or both the thumbnail image and the image itself may be moving video images sequences. Further, although the list information, thumbnail images and images manipulated by the user interface described above and associated display control apparatus are described as being stored in the same memory (in an example embodiment, the HD 30 of FIG. 5), each of these may be stored in a separate memory.

The user interface described above and associated display control apparatus may be implemented differently than the implementations set forth above. For example the pages of list information and thumbnail information may be implemented a non-wrap-around linked lists or wrap-around link lists that, for example, permit the display of list information or thumbnail images for IDs 20, 21, 22, 1, 2, 3, . . . , etc.

Further, the user interface described above and associated display control apparatus may manipulate or modify the number of pages of any attribute, which may result in the number of pages needed to display all entries of that attribute to increase, decrease, or stay the same (albeit with some of the entries being assigned to different pages numbers).

Further, the user interface described above and associated display control apparatus may be implemented in various other ways. For example, a CPU may be provided in any one of the scanner 40 and the printer 50 shown in FIG. 3. In another example, a double-sided copying mechanism may be additionally provided to allow the image forming apparatus 1 to form an image on both sides of the recording medium.

Further, the screen displayed by the LCD 71 is not limited to the above-described examples.

Further, elements and/or features of different example embodiments may be combined with each other and/or substituted for each other within the scope of this disclosure and appended claims.

Further, any one of the above-described and other example features of the present invention may be embodied in the form of an apparatus, method, system, computer program and computer program product.

Further, any one of the above-described and other example features of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM, etc. Furthermore, various information regarding the stored images, for example, property information, may be stored in any other form, or it may be provided in other ways.

Alternatively, any one of the above-described and other example methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. A display control apparatus, comprising:
a storage device configured to store a plurality of images;
a display configured to display one of a thumbnail screen and a list screen at a time, where the thumbnail screen displays the images in the form of thumbnails in one or more pages, and the list screen displays the images in the form of entries containing property information of the images in one or more pages, a maximum number of images that can be displayed on each page of the thumbnail screen being different from a maximum number of images that can be displayed on each page of the list screen; and
a controller configured to cause the display to switch between the thumbnail screen and the list screen according to a user instruction, wherein
when the display displays a current page of a first screen which firstly lists a selected one of the images and shows a total page number indicating a total number of the one or more pages of the first screen, the first screen being one of the thumbnail screen and the list screen, and
the controller receives a user instruction for switching from the first screen to a second screen, the second screen being the other one of the thumbnail screen and the list screen,
the controller calculates a total number of the one or more pages of the second
screen using information regarding the selected image that is firstly listed on the current page of the first screen and the maximum number of images that can be displayed on each page of the second screen to obtain a total page number of the second screen, and
the display displays a current page of the second screen, where the current page of the second screen firstly lists the selected image that is firstly listed on the current page of the first screen and shows the calculated total page number of the second screen.

2. The apparatus of claim 1, wherein
the current page of the first screen further shows a current page number indicating a number of the current page of the first screen,
the controller calculates a number of the current page of the second screen using information regarding the selected image that is firstly listed on the current page of the first screen and the maximum number of images that can be displayed on each page of the second screen to obtain a current page number of the second screen, and the current page of the second screen further shows the calculated current page number of the second screen.

3. The apparatus of claim 2, wherein
when the controller further receives a user instruction for displaying a previous page of the one or more pages of the second screen that precedes the current page of the second screen,
the controller determines whether a number of images that precedes the selected image that is firstly listed on the current page of the second screen is less than the maximum number of images that can be displayed on each page of the second screen to generate a determination result, and
when the determination result indicates that the number of images that precedes the first listed image is less than the maximum number of images of the second screen,
the controller causes the display to display an initially set value of the total page number on the previous page of the second screen, the initially set value being obtained based on a total number of the images and the maximum number of images of the second screen.

4. A method of controlling a display, comprising:
storing a plurality of images;
displaying one of a thumbnail screen and a list screen on a display at a time, where the thumbnail screen displays the images in the form of thumbnails in one or more pages, and the list screen displays the images in the form of entries containing property information of the images in one or more pages, a maximum number of images that can be displayed on each page of the thumbnail screen being different from a maximum number of images that can be displayed on each page of the list screen;
displaying a current page of a first screen which firstly lists a selected one of the images and shows a total page number indicating a total number of the one or more pages of the first screen, the first screen being one of the thumbnail screen and the list screen;
receiving a user instruction for switching from the first screen to a second screen, the second screen being the other one of the thumbnail screen and the list screen;
calculating a total number of the one or more pages of the second screen using information regarding the selected image that is firstly listed on the current page of the first screen and the maximum number of images that can be displayed on each page of the second screen to obtain a total page number of the second screen; and
displaying a current page of the second screen, wherein the current page of the second screen firstly lists the selected image that is firstly listed on the current page of the first screen and shows the calculated total page number of the second screen.

5. The method of claim 4, further comprising:
displaying, on the current page of the first screen, a current page number indicating a number of the current page of the first screen;
calculating a number of the current page of the second screen using information regarding the selected image that is firstly listed on the current page of the first screen and the maximum number of images that can be displayed on each page of the second screen to obtain a current page number of the second screen; and
displaying, on the current page of the second screen, the calculated current page number of the second screen.

6. The method of claim 5, further comprising:
receiving a user instruction for displaying a previous page of the one or more pages of the second screen that precedes the current page of the second screen;
determining whether a number of images that precedes the selected image that is firstly listed on the current page of the second screen is less than the maximum number of images that can be displayed on each page of the second screen to generate a determination result; and
displaying an initially set value of the total page number on the previous page of the second screen when the determination result indicates that the number of images that precedes the first listed image is less than the maximum number of images of the second screen, the initially set value being obtained based on a total number of the images and the maximum number of images of the second screen.

7. A non-transitory recording medium storing instruction segments for controlling a display, which when executed on an image processing apparatus, cause the image processing apparatus to execute instructions comprising:
storing a plurality of images;
displaying one of a thumbnail screen and a list screen on a display at a time, where the thumbnail screen displays the images in the form of thumbnails in one or more pages, and the list screen displays the images in the form of entries containing property information of the images in one or more pages, a maximum number of images that can be displayed on each page of the thumbnail screen being different from a maximum number of images that can be displayed on each page of the list screen;
displaying a current page of a first screen which firstly lists a selected one of the images and shows a total page number indicating a total number of the one or more pages of the first screen, the first screen being one of the thumbnail screen and the list screen;
receiving a user instruction for switching from the first screen to a second screen, the second screen being the other one of the thumbnail screen and the list screen;
calculating a total number of the one or more pages of the second screen using information regarding the selected image that is firstly listed on the current page of the first screen and the maximum number of images that can be displayed on each page of the second screen to obtain a total page number of the second screen; and
displaying a current page of the second screen, wherein the current page of the second screen firstly lists the selected image that is firstly listed on the current page of the first screen and shows the calculated total page number of the second screen.

8. The non-transitory recording medium of claim 7, wherein the instructions further comprise:
displaying, on the current page of the first screen, a current page number indicating a number of the current page of the first screen;
calculating a number of the current page of the second screen using information regarding the selected image that is firstly listed on the current page of the first screen and the maximum number of images that can be displayed on each page of the second screen to obtain a current page number of the second screen; and
displaying, on the current page of the second screen, the calculated current page number of the second screen.

9. The non-transitory recording medium of claim 8, wherein the instructions further comprise:
receiving a user instruction for displaying a previous page of the one or more pages of the second screen that precedes the current page of the second screen;
determining whether a number of images that precedes the selected image that is firstly listed on the current page of the second screen is less than the maximum number of images that can be displayed on each page of the second screen to generate a determination result; and displaying an initially set value of the total page number on the previous page of the second screen when the determination result indicates that the number of images that precedes the first listed image is less than the maximum number of images of the second screen, the initially set value being obtained based on a total number of the images and the maximum number of images of the second screen.

* * * * *